March 18, 1930.  J. G. LINDEMAN  1,751,010
WHEEL MOUNTING FOR LAND VEHICLES
Filed Jan. 31, 1929
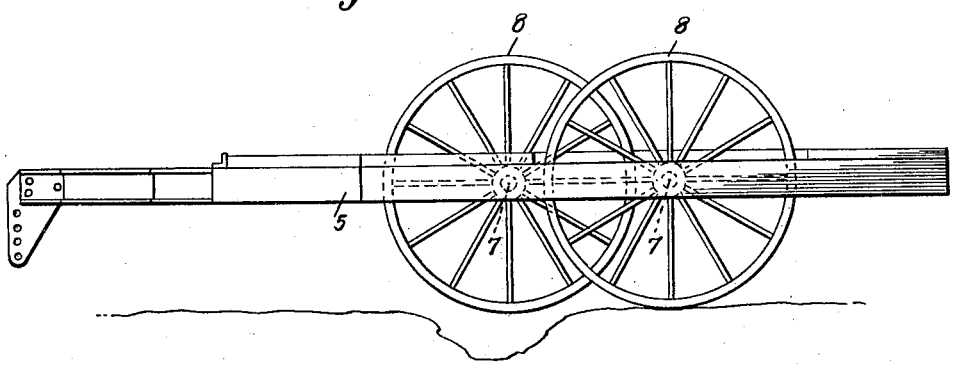
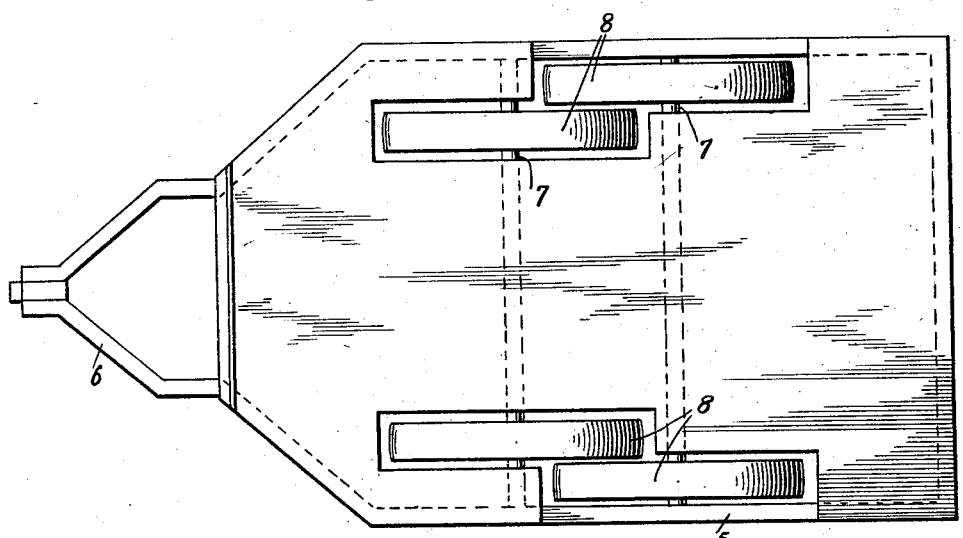
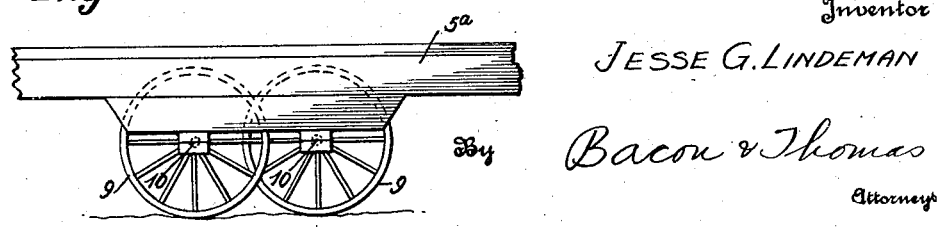
Inventor
JESSE G. LINDEMAN
By Bacon & Thomas
Attorneys Patented Mar. 18, 1930

1,751,010

UNITED STATES PATENT OFFICE

JESSE G. LINDEMAN, OF YAKIMA, WASHINGTON

WHEEL MOUNTING FOR LAND VEHICLES

Application filed January 31, 1929. Serial No. 336,373.

This invention relates to improvements in wheel mountings for land vehicles and more particularly the invention relates to wheel mountings for all types of vehicles, implements or trailers being propelled by an external source of power.

An important object of the invention is the provision of a wheel mounting for a land vehicle which will enable the latter to be supported on four ground engaging wheels, all of which have their axle supported rigid with respect to the vehicle frame or chassis, and yet the said wheels will be arranged with respect to each other so that the vehicle may be turned in the same manner as an ordinary two wheeled vehicle.

A further object of the invention is to provide a wheeled mounting for a land vehicle which will permit the latter to be used in irrigated districts, or the like, and wherein the vehicle will travel over ditches, or other irregularities, without any of the wheels dropping into ditches or other similar depressions.

Other objects and advantages of the invention will be apparent during the course of the following description.

In the accompanying drawings forming a part of this specification and in which like numerals are employed to designate like parts throughout the same, Fig. 1 is a side elevation view of one form of wheel support embodying this invention, Fig. 2 is a top plan view of the structure shown in Fig. 1, and, Fig. 3 is a side elevation view of a modified form of wheel support.

In the drawing, wherein for the purpose of illustration is shown the proposed embodiment of the invention, the numeral 5 designates in its entirety the frame or chassis of a land vehicle of the general type which is adapted for being pulled or pushed over the ground by means of an external source of power, such as an automobile, a tractor, etc. For the purpose of propelling the vehicle frame 5, the frame has attached to one end thereof a draft coupling 6 which may be of any desired shape or style.

It is to be understood that the frame 5 may be supported by relatively large wheels which extend above the plane of the frame. Such a type of wheel is illustrated in Fig. 1. It also is to be understood that the frame 5 may be supported by relatively small wheels which will not extend above the floor line of the vehicle frame. Such a type of wheel is illustrated in Fig. 3, the small wheels being associated with the vehicle frame 5ª.

Returning to our discussion of Fig. 1, it will be seen that the frame 5 has suitably secured thereto axles 7 upon which are rotatably mounted the wheels 8. These relatively large wheels 8 extend above the plane of the floor of the frame 5. It also will be noted that the wheels are arranged in staggered relation with respect to each other and overlap to a considerable extent. In fact, the wheels 8 are intended to be overlapped to the greatest extent possible, just so sufficient clearance is provided between the peripheries of the wheels and the axles 7. It also will be noted that the distance between the axles 7 is less than the diameter of either wheel.

In the figure best illustrating the vehicle including the frame 5ª, the wheels 9 are supported on axles 10. It is to be understood that these axles 10 are positioned as closely as possible to each other and that the wheels 9 are offset or staggered with respect to each other and overlap to the greatest extent practical.

It will be noted that the axles 7 and 10 do not oscillate or pivot with respect to the frames 5 and 5ª respectively. It is intended that these axles be non-pivotally mounted with respect to the frame whereby none of the wheels will articulate for steering purposes. The wheels are so closely positioned to each other that a vehicle equipped with the same may be pivoted in substantially the same manner as an ordinary two wheeled vehicle may be pivoted. This arrangement of wheels will enable a vehicle to be supported by four wheels instead of two and yet the benefits of a four wheeled support will be obtained. It also will be noted that when a vehicle frame, of the type illustrated in the various figures, is attached to a tractor or the like, by means of a draft attachment 6, the vehicle may be pulled over irregular surfaces, such as irrigated fields, without any of the wheels dropping into a ditch, or the like. Fig. 1 discloses a vehicle frame passing over a ditch and being supported by one pair of axially alined wheels while the remaining pair of wheels are out of contact with the ground due to the fact that they are being carried over a ditch or similar depression.

It is to be understood that the preferred embodiment of the invention has been disclosed and described and that various changes in shape, size, and arrangement of parts may be reverted to without departing from the spirit of the invention or the scope of the subjoined claims.

Having thus described the invention, I claim:

1. A device of the type described, comprising a frame, a pair of ground engaging wheels for each side of the frame located substantially centrally of the length of the frame to balance the entire load on said wheels, the wheels of each pair being closely positioned with respect to each other so that their axes are spaced a distance less than the diameter of either wheel, and a pair of axles extending entirely across the frame and each supporting one wheel of each of said pairs, said axles being connected to the frame and the wheels to prevent bodily movement of the wheels with respect to the frame.

2. A device of the type described, comprising a frame, a pair of ground engaging wheels for each side of the frame and substantially centrally of the length of the frame to balance the entire load on said wheels and located inwardly of the side edge of said frame, the wheels of each pair being closely positioned in overlapping relation with respect to each other so that their axes are spaced a distance less than the diameter of either wheel, and a pair of non-pivoting and non-oscillating axles extending entirely across the frame and each supporting one wheel of each of said pairs.

3. A device of the type described, comprising a frame, a pair of ground engaging wheels for each side of the frame and located substantially centrally of the length of the frame to balance the entire load on said wheels, the wheels of each pair being closely positioned with respect to each other so that their axes are spaced a distance less than the diameter of either wheel and with the wheels on one side of the frame arranged in axial alignment with the wheels on the other side of the frame, and axles for connecting the wheels to the frame, the connections between the axles and the frame and the axles and the wheels preventing bodily movement of the wheels with respect to the frame.

In testimony whereof I affix my signature.

JESSE G. LINDEMAN.